(12) United States Patent
Walser et al.

(10) Patent No.: US 7,404,655 B2
(45) Date of Patent: Jul. 29, 2008

(54) VEHICLE REARVIEW ASSEMBLY INCLUDING A MAP LIGHT

(75) Inventors: Jeremy A. Walser, Raleigh, NC (US); Kenton J. Ypma, Hudsonville, MI (US); Mark W. Newton, Holland, MI (US); John W. Carter, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 259 days.

(21) Appl. No.: 11/382,610

(22) Filed: May 10, 2006

(65) Prior Publication Data

US 2007/0263400 A1    Nov. 15, 2007

(51) Int. Cl.
*B60Q 1/26* (2006.01)
(52) U.S. Cl. .................... 362/494; 362/328; 362/800
(58) Field of Classification Search ............... 362/494, 362/326, 328, 800
See application file for complete search history.

(56) References Cited

U.S. PATENT DOCUMENTS

| | | | |
|---|---|---|---|
| 2,682,117 A * | 6/1954 | Wales ........................ 434/219 |
| 5,434,407 A | 7/1995 | Bauer et al. |
| 5,803,579 A | 9/1998 | Turnbull et al. |
| 6,092,917 A * | 7/2000 | Litke et al. .................. 362/490 |
| 6,335,548 B1 | 1/2002 | Roberts et al. |
| 6,441,943 B1 | 8/2002 | Roberts et al. |
| 6,639,360 B2 | 10/2003 | Roberts et al. |
| 7,118,931 B2 * | 10/2006 | Roberts ........................ 438/27 |
| 2001/0026011 A1 | 10/2001 | Roberts et al. |
| 2003/0043590 A1 | 3/2003 | Walser et al. |
| 2003/0156425 A1 | 8/2003 | Turnbull et al. |
| 2004/0084681 A1 * | 5/2004 | Roberts ........................ 257/79 |
| 2005/0036328 A1 | 2/2005 | Walser et al. |
| 2005/0077623 A1 | 4/2005 | Roberts et al. |
| 2005/0195594 A1 * | 9/2005 | Kurtz ........................ 362/184 |
| 2005/0201113 A1 | 9/2005 | Tuttle et al. |
| 2005/0265037 A1 | 12/2005 | Newton et al. |

* cited by examiner

*Primary Examiner*—Ali Alavi
(74) *Attorney, Agent, or Firm*—Price, Heneveld, Cooper, DeWitt & Litton, LLP

(57) ABSTRACT

Rearview assemblies for a vehicle are provided. The rearview assembly includes a housing coupled to a mounting structure that is configured to be mounted in a vehicle. The housing includes a rearward viewing means, and also includes a lamp subassembly. The lamp subassembly includes a single white LED device mounted to a substrate, and also includes an optical assembly with secondary optics for reflecting and refracting light emitted from the LED such that the emitted light forms two separate pools of light external to the rearview assembly. In an alternate embodiment, the lamp subassembly is included in a mounting structure for a vehicle rearview assembly. In still another embodiment, a vehicle optical accessory is provided, in which the vehicle optical accessory has one LED that provides two separate pools of light external to the vehicle optical accessory.

74 Claims, 7 Drawing Sheets

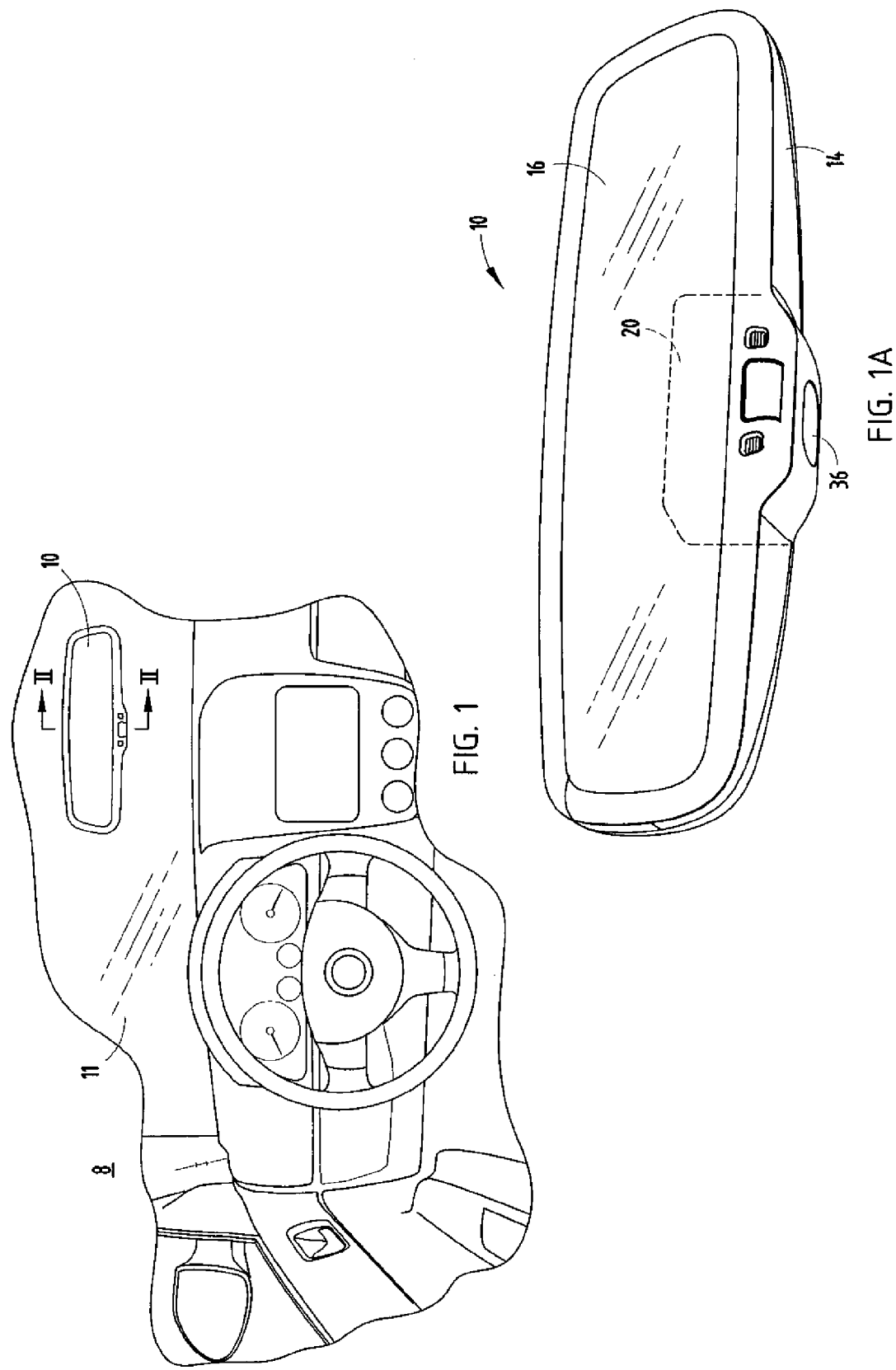

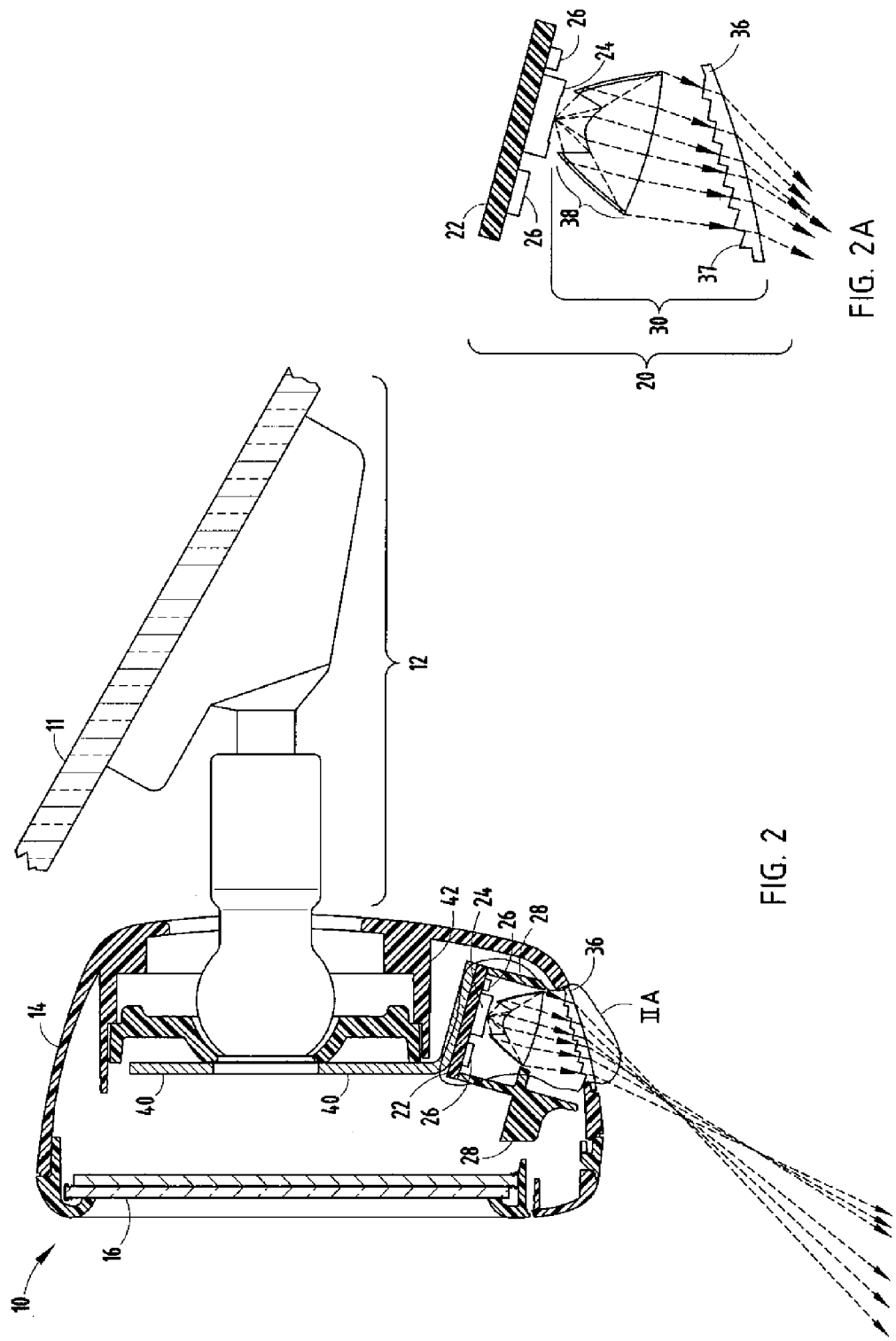

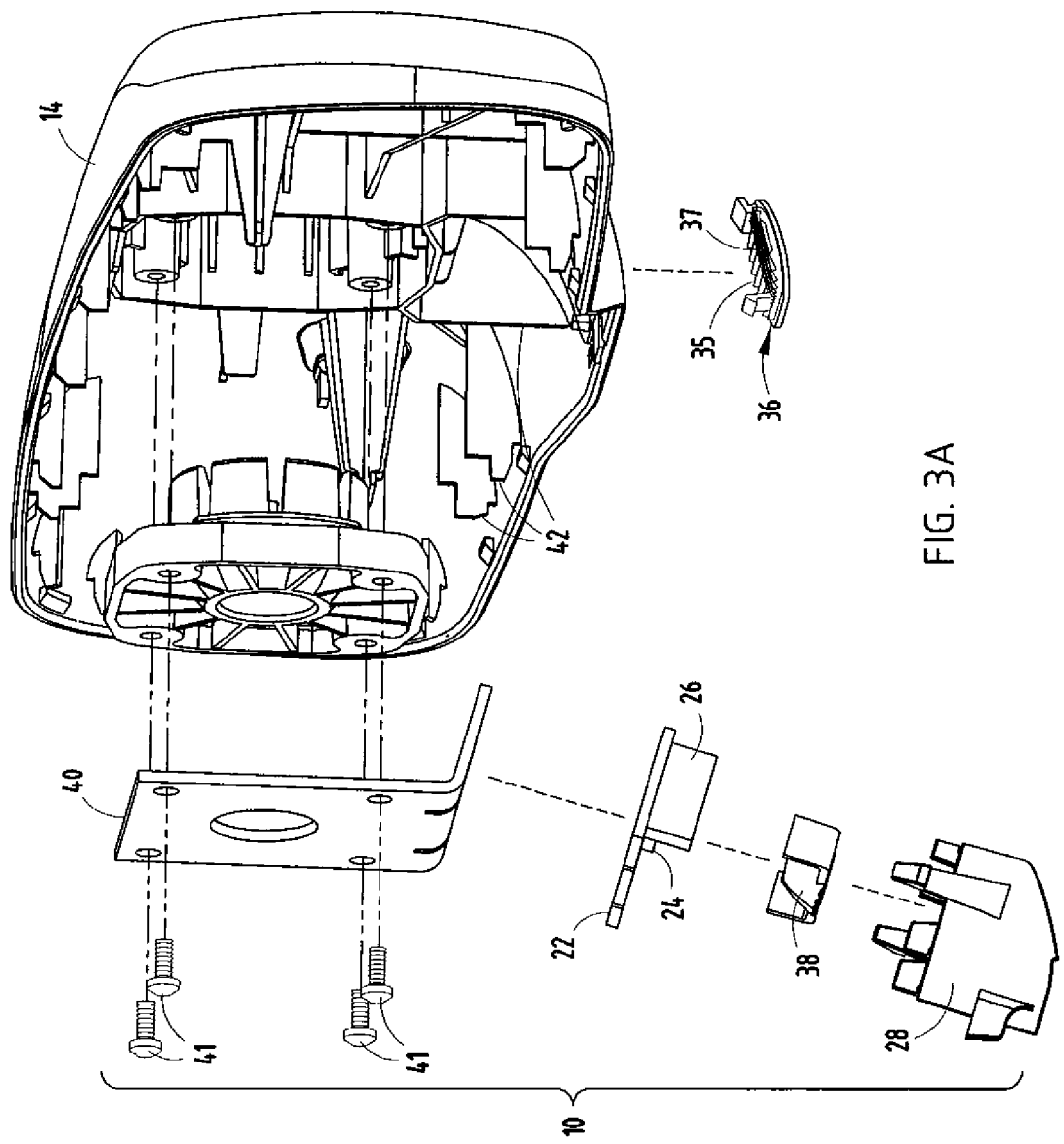
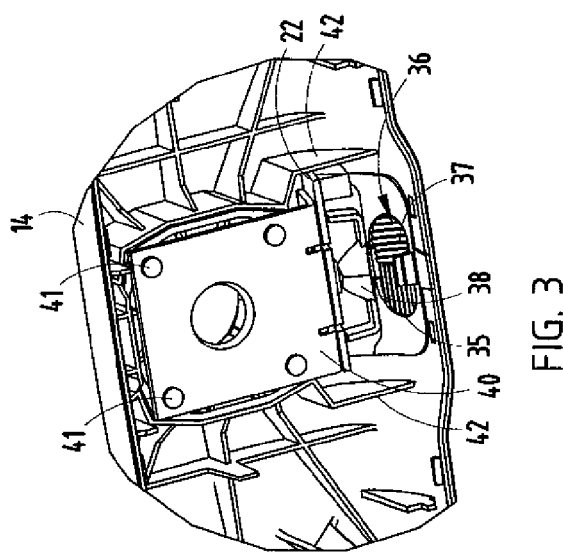
FIG. 3A
FIG. 3

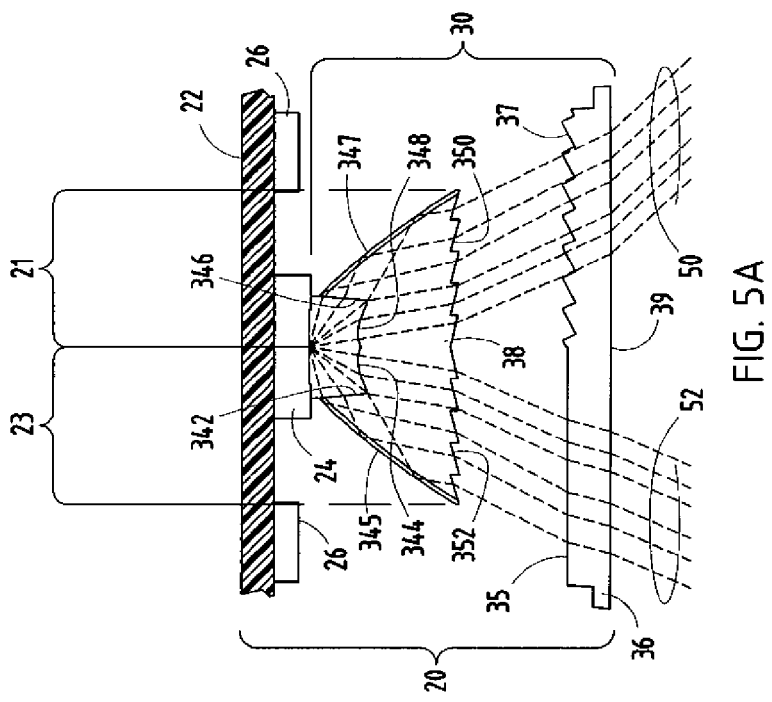
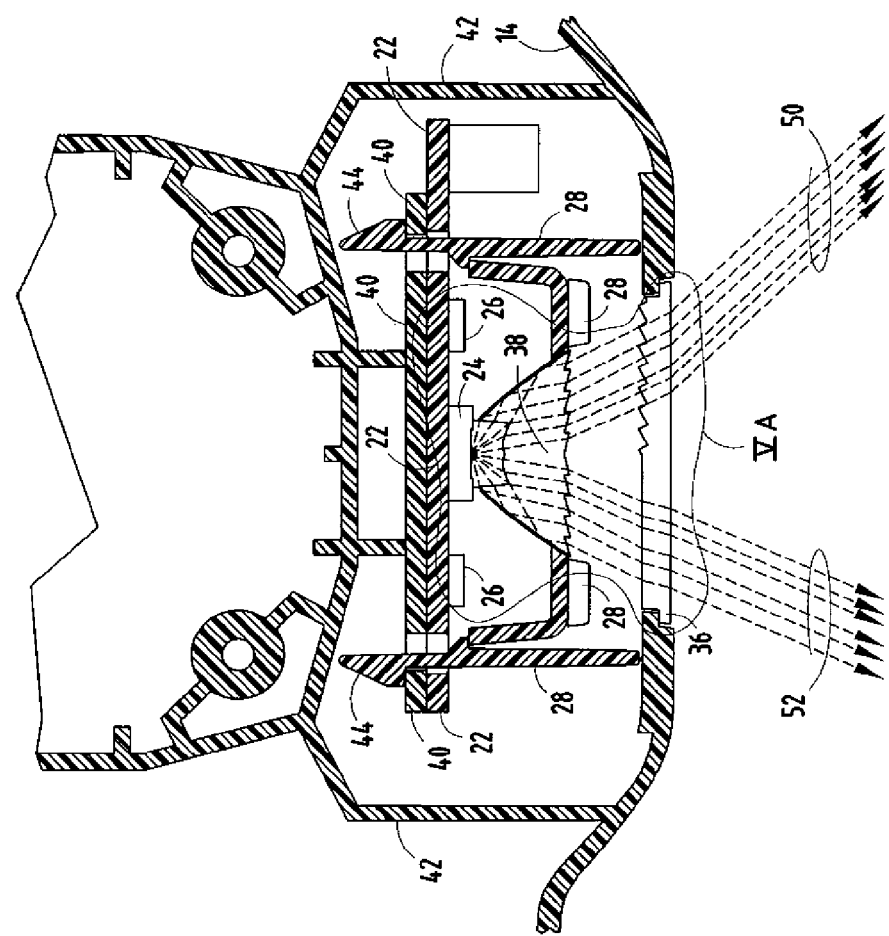
FIG. 5A
FIG. 5

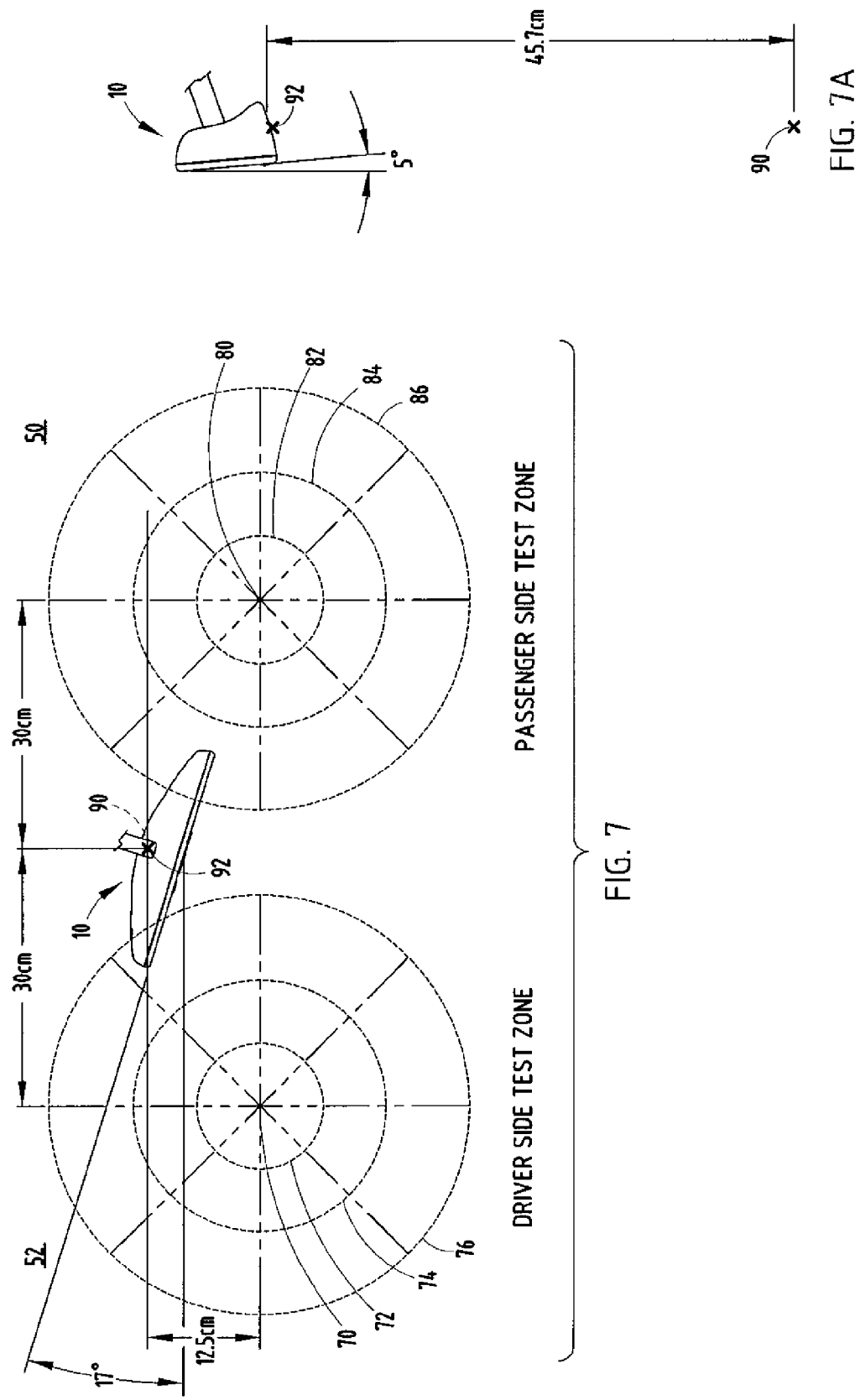

VEHICLE REARVIEW ASSEMBLY INCLUDING A MAP LIGHT

BACKGROUND OF THE INVENTION

The present invention generally relates to vehicle lamp assemblies, and more particularly relates to map lamp assemblies for implementation in rearview mirror assemblies.

Semiconductor optical radiation emitters are semiconductor devices that emit optical radiation in response to electrical excitation. Examples of semiconductor optical radiation emitters include light emitting diodes (LEDs), light emitting polymers (LEPs), organic light emitting devices (OLEDs, polymer light emitting devices (PLEDs), and others devices.

In some applications, multi-color combinations of pluralities of visibly colored LEDs are being used as the source of projected white light for illumination in binary-complementary and ternary RGB illuminators. Such illuminators are useful as vehicle or aircraft maplights, for example, or as vehicle or aircraft reading or courtesy lights, cargo lights, license plate illuminators, backup lights, and exterior mirror puddle lights. Other pertinent uses include portable flashlights and other illuminator applications where rugged, compact, lightweight, high efficiency, long-life, low voltage sources of white illumination are needed. Phosphor-enhanced "white" LEDs may also be used in some of these instances as illuminators.

With the advent of light emitting diode (LED) illuminator assemblies capable of emitting white light, LEDs have now been implemented in vehicle lamp assemblies. An example of a rearview mirror assembly incorporating LED map lamps is disclosed in commonly assigned U.S. Pat. No. 5,803,579. One form of LED developed by the assignee for use in vehicle lamp assemblies is disclosed in U.S. Pat. Nos. 6,335,548 and 6,441,943. As disclosed in U.S. Pat. No. 6,441,943, the LEDs disclosed in U.S. Pat. No. 6,335,548 may be placed in mirror assemblies and connected to heat sinks within those mirror assemblies. In another example of the use of LEDs in a mirror assembly, a plurality of blue-green and amber LEDs is positioned in two separate groups for emitting light onto the lap area of the driver and front passenger, with each of the two groups of LEDs providing illumination to a separate area.

The use of LEDs in rearview assemblies can be highly effective and advantageous over assemblies incorporating incandescent bulbs for a number of reasons. Reduced power consumption, reduced heat dissipation, and lower cost are some of the reasons that LEDs can be an attractive alternative to incandescent bulbs in vehicle rearview assemblies. However, while the use of LEDs in rearview assemblies can provide benefits, it is often desirable to provide adequate illumination for multiple separate areas, such as the lap area of a driver and the lap area of a front passenger, while at the same time reducing the component count and associated cost required for construction of such rearview mirror assemblies.

SUMMARY OF THE INVENTION

According to one embodiment of the present invention, a rearview assembly for a vehicle is provided. The rearview assembly includes a housing coupled to a mounting structure that is configured to be mounted in a vehicle. The housing includes a rearward viewing device, and also includes a lamp subassembly. The lamp subassembly includes a single white LED device mounted to a substrate, and also includes an optical assembly with secondary optics for reflecting and refracting light emitted from the LED device such that the emitted light forms two separate pools of light external to the rearview assembly.

According to another embodiment of the present invention, a rearview assembly for a vehicle is provided. The rearview assembly includes a housing coupled to a mounting structure that is configured to be mounted in a vehicle. The housing includes a rearward viewing device. The mounting structure includes a lamp subassembly. The lamp subassembly includes a single white LED device mounted to a substrate, and also includes an optical assembly with secondary optics for reflecting and refracting light emitted from the LED device such that the emitted light forms two separate pools of light external to the rearview assembly.

According to yet another embodiment of the present invention, a vehicle optical accessory is provided. The vehicle optical accessory includes a housing configured to be mounted in a vehicle. The housing includes a lamp subassembly located at least partially in the housing. The lamp subassembly includes a single white LED device mounted to a substrate, and also includes an optical assembly with secondary optics for reflecting and refracting light emitted from the LED device such that the emitted light forms two separate pools of light external to the vehicle optical accessory.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a cockpit view of a vehicle including a rearview assembly, according to a first embodiment of the invention;

FIG. 1A is an orthographic view of a rearview assembly for a vehicle, according to the first embodiment of the invention;

FIG. 2 is a cross-sectional view taken through the line II of FIG. 1, further illustrating the rearview assembly according to the first embodiment;

FIG. 2A is an exploded cross section further illustrating a lamp subassembly, according to the first embodiment;

FIG. 3 is an orthographic view of a rear housing assembly, according to the first embodiment;

FIG. 3A is an exploded rear perspective view of the rearview assembly according to the first embodiment;

FIG. 5 is a is a cross-sectional view of a cutout section of FIG. 1, further illustrating the rearview assembly according to the first embodiment;

FIG. 5A is a close-up view of certain elements in the cross-sectional view of FIG. 5;

FIG. 7 is a top view showing characteristics of separate light pools provided according to the first embodiment of the present invention;

FIG. 7A is a side view showing the relative position of reference points and the rearview assembly of FIG. 7;

DETAILED DESCRIPTION OF THE PREFERRED EMBODIMENTS

Figure 6:
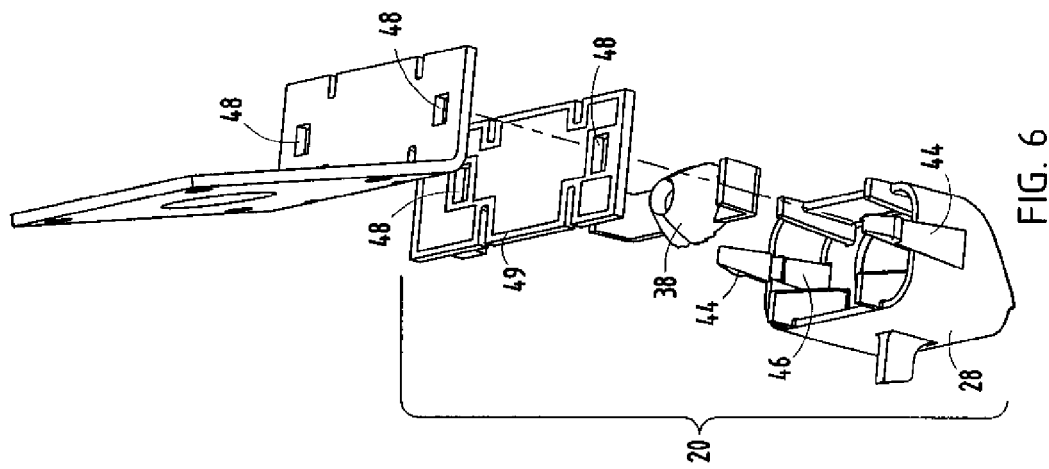
FIG. 6 is an exploded view of elements of the rearview assembly according to a second embodiment of the present invention.

FIG. 1 is a cockpit view of a vehicle 8 including a rearview assembly 10, according to a first embodiment of the present invention. As shown, rearview assembly 10 is mounted to the front windshield of vehicle 8. In an alternate embodiment, rearview assembly 10 is mounted to the vehicle header of vehicle 8. FIG. 1A is a close-up perspective view of the rearview assembly 10, according to the first embodiment. Rearview assembly 10 is mounted to a windshield 11 by means of a mounting structure 12 (not shown). Rearview assembly 10 includes rearward viewing device 16 for providing a vehicle occupant with a view to the rear of the vehicle. Rearview assembly 10 also includes a lamp subassembly 20 located in housing 14 and generally shown as hidden lines in FIG. 1A. Lamp subassembly 20 is configured to provide light external to rearview assembly 10. The light provided by lamp subassembly 20 exits rearview assembly 10 by means of a refracting lens 36 located on the bottom of housing 14.

FIGS. 2-5 provide additional views of the rearview assembly 10, according to the first embodiment of the present invention. In the present embodiment, lamp subassembly 20 includes a substrate 22, a single white LED device 24, an inner lens 38 consisting of inner refractive collecting surfaces, TIR (Total Internal Reflection) surfaces, and outer refractive surfaces, and refracting lens 36. Referring to FIGS. 2-5, components of lamp subassembly 20 are located in and/or on housing 14. In the present embodiment, all components but refracting lens 36 are coupled to housing 14 by means of a bracket 40. As shown, bracket 40 is a plastic plate having a cross-section that is generally in the shape of an L. Bracket 40 also includes a number of holes through which fasteners 41 pass in order to connect bracket 40 to housing 14. It should be appreciated that bracket 40 could be made of materials other than plastic, such as, for example, a metal or thermally conductive polymer, and that bracket 40 could have other shapes, provided that bracket 40 functions to secure components of lamp subassembly 20 to housing 14.

Figure 4A:
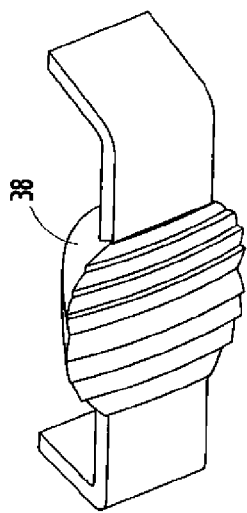
FIG. 4A is an orthographic view of an inner lens of a lamp subassembly including inner refractive collecting surfaces, refractive riser walls, and reflective surfaces, according to the first embodiment.
Figure 4B:
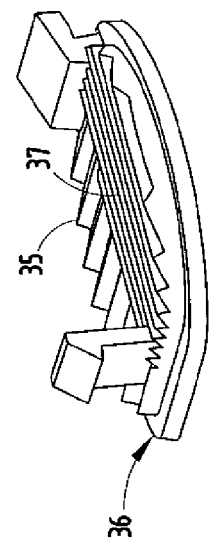
FIG. 4B is an orthographic view of a refracting lens of a lamp subassembly, according to the first embodiment.
Figure 4:
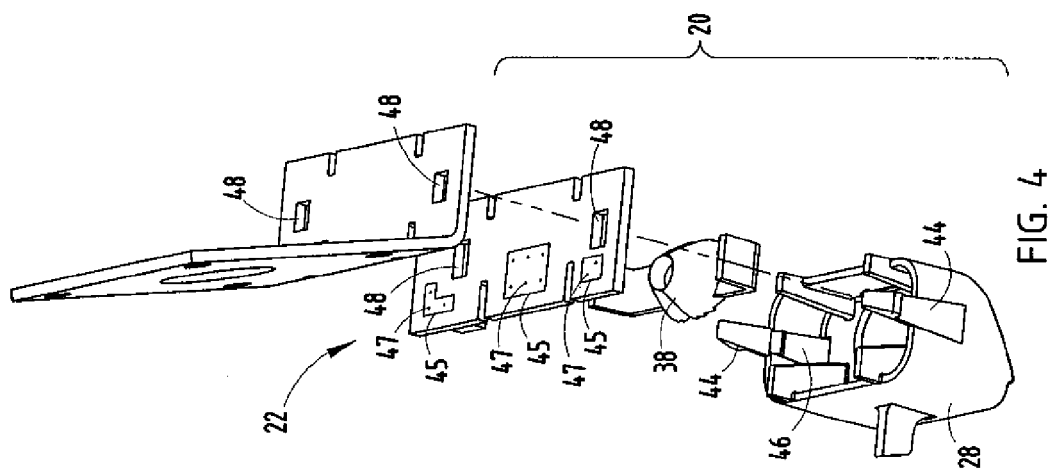
FIG. 4 is an exploded view of a lamp subassembly according to the first embodiment.

As already noted, lamp subassembly 20 includes a substrate 22, to which electronic devices can be mounted. As shown specifically in FIG. 4, substrate 22 may include multiple areas that have been coated with a metal plating 45. Both surfaces of substrate 22 may have areas of metal plating 45, although only one surface is shown in FIG. 4. The areas of metal plating 45 on one surface of substrate 22 are connected to areas of metal plating 45 on the opposite surface of substrate 22 by means of conductive vias 47, which are thermally and electrically conducting filaments that pass through substrate 22 to connect the layers of metal plating 45. In this manner, areas of metal plating 45 on one surface of substrate 22 are thermally and electrically connected to areas of metal plating 45 on the other opposite surface of substrate 22. The metal plating 45 deposited on the surface of substrate 22 acts to radiate heat generated by components mounted to substrate 22, helping to remove the heat generated by those components. By employing metal plating 45, the use of an external heat sink can be avoided, reducing the space required to implement lamp subassembly 20, and helping to reduce system costs. Referring specifically to FIG. 2, substrate 22 is also shown having circuit devices 26 attached to at least one of its main surfaces. Circuit devices 26 may include integrated circuits (ICs) and/or discrete circuit devices, such as resistors, transistors, capacitors, inductors, and diodes. As shown, substrate 22 is a printed circuit board (PCB) configured to electrically couple the various circuit devices and elements located on its main surfaces to each other. Substrate 22 also includes an electrical connector (not shown) coupled to the circuit devices on the surfaces of substrate 22, and configured to provide power and other electrical signals to those devices.

Substrate 22 also includes a single white LED device 24 that is electrically and physically connected to the substrate 22 using conventional soldering techniques. Single white LED device 24 includes one or more semiconductor LED chips and/or phosphors configured to complement one another to form white light. LED devices suitable for the present invention are available commercially from a number of suppliers, including Nichia, Osram, Lumileds, and Cree Research, among others. Other LEDs suitable for the present invention can be constructed as disclosed in U.S. Pat. No. 6,335,548; U.S. Patent Application Publication No. 2001/0026011; U.S. patent application Ser. No. 09/723,675, now abandoned; or U.S. Pat. No. 6,639,360, the entire disclosures of which are incorporated herein by reference.

The single white LED device 24 is used to produce light that is ultimately reflected and refracted to form two substantially separate pools of light external to the rearview assembly 10. Other elements of lamp subassembly 20 are configured so that these pools of light are positioned such that they provide light for an occupant of the driver seat and passenger seat of the vehicle. Single white LED device 24 is connected to power and a switching device by means of the electrical connector connected to the substrate (not shown), as discussed above.

As best shown in FIG. 2A, lamp subassembly 20 includes an optical assembly 30 positioned adjacent to the single white LED device 24. Optical assembly 30 includes components that use refraction, reflection, scattering, absorption, interference, and diffraction to alter the shape, pattern, intensity, distribution, spectral distribution, orientation, divergence, and other properties of the light emitted by single white LED device 24. More specifically, optical assembly 30 includes secondary optics 38 and 36. As shown, secondary optic 38 is an inner lens consisting of refracting and TIR reflecting optics, and secondary optic 36 is a lens using refracting optics. As shown, the refractive collecting surfaces, TIR reflecting surfaces, and outer refractive surfaces of inner lens 38 act to influence the direction traveled by light exiting white led device 24. Optical assembly 30 is positioned adjacent to the single white LED device 24, such that light from the single white LED device 24 is refracted and reflected by inner lens 38 to form two substantially separate beams of light. These beams, referred to as first light pool 50 and second light pool 52, are refracted again by refracting lens 36 to further direct the separated beams as two substantially separate pools of light to two different areas of a vehicle compartment. As shown in FIG. 7, optical assembly 30 directs one pool of light to the general vicinity of the driver seat of the vehicle (referred to in FIG. 7 as the driver side test zone), and the other pool of light to the general vicinity of the passenger seat of the vehicle (referred to as the passenger side test zone). It should be appreciated that in vehicles in which the driver occupies the right side of the vehicle, the zones generally illustrated in FIG. 7 would be reversed, with the passenger side test zone being located on the left and the driver side test zone being located on the right.

Returning to FIGS. 2-5, optical assembly 30 is shown as including an inner lens 38, which is composed of inner refractive collecting surfaces 344 and 348, refractive riser walls 342 and 346, TIR reflective surfaces 345 and 347, and outer refractive surfaces 350 and 352, and which also includes arms extending outward from its sides for mounting unitary optical structure 38 to other devices. As shown, unitary optical structure 38 is formed from clear plastic. TIR reflective surfaces 345 and 347 are implemented in inner lens 38 with highly polished or diamond cut surfaces, such that light emitted by single white LED device 24 that impacts the polished surface is reflected and directed in a generally downward direction. As shown, inner lens 38 is positioned in very close proximity to single white LED device 24 of lamp subassembly 20. Inner lens 38 is positioned such that it almost completely enclose single white LED device 24. Because of the shape and positioning of inner lens 38, almost all of the light emitted by single white LED device 24 passes through inner lens 38.

Inner lens 38 is oriented radially around single white LED device 24 in order to collect light emitted by single white LED device 24 and redirect the light such that it is directed into two substantially separate pools of light by the time the light exits the bottom of inner lens 38.

As best shown in FIG. 5A, inner lens 38 is bifurcated into two halves: a first half 21 for producing first light pool 50; and a second half 23 for producing second light pool 52. The initial optical interface of first half 21 includes a convex refractive surface 342, a refractive riser wall 346, and a TIR reflecting surface 347. The initial optical interface of second half 23 includes a convex refractive surface 344, a refractive riser wall 342, and a TIR reflecting surface 345. Depending on the angle of light entering the inner lens 38, some of the light is purely refracted and some of it is refracted and then totally internally reflected. Convex refractive surfaces 348 and 344 act to collect light rays emitted from the single white LED device 24, and redirect the light generally outward to split the light into two separate beams towards optics 350 and 352, respectively. Refractive riser wall surfaces 346 and 342 act to collect light rays emitted from the single LED device 24 and redirect the light toward the TIR surfaces 347 and 345, which are then totally internally reflected by TIR surfaces 347 and 345 to redirect the light generally outward to split the light into two separate beams towards optics 350 and 352. In this manner, light rays emanating from single white LED device 24 are formed into two substantially separate pools of light.

As shown, the bottom surface of inner lens 38 has optically deviating surfaces 350 and 352, corresponding to first half 21 and second half 23 of inner lens 38. Optically deviating surfaces 350 and 352 are configured to further alter the direction at which light emanating from single white LED device 24 and exiting the bottom of inner lens 38 travels. The optically deviating surfaces 350 and 352 are integrally formed as a plurality of angled facets on the outside lower surface of inner lens 38. The effect of the optically deviating surfaces 350 and 352 is to further separate the two substantially separate pools of light emanating from inner lens 38.

It should be appreciated that in alternate embodiments, the optically deviating surfaces 350 and 352 shown on the bottom surface of inner lens 38 could be a separate component from convex refractive surfaces 348 and 344, refractive riser walls 346 and 342, and TIR reflective surfaces 347 and 345. It should also be appreciated that by changing the optical prescription of the upper and lower surfaces of inner lens 38, the location and intensity of the two substantially separate pools of light emanating from inner lens 38 can be altered.

Although convex refractive surfaces 348 and 344, refractive riser walls 346 and 342, and TIR reflective surfaces 347 and 342 are one unitary optical structure 38 in the present embodiment, it should be appreciated that in an alternative embodiment, reflecting surfaces 347 and 345 could be such that they are not TIR surfaces. This would require surfaces 347 and 345 to be plated with a reflective material, such as metal, so that light will be reflected off surfaces 347 and 345, and transmitted through surfaces 350 and 352. In yet another alternative embodiment, inner lens 38 is replaced by a reflector that is made of a plastic or other material that has been plated with a reflective material, such as metal. Additional suitable reflectors are well known to those skilled in the art, and may be obtained commercially from a wide variety of optical molding and coating companies, such as Reed Precision Microstructures of Santa Rosa, Calif. It should also be appreciated that inner lens 38 could be made of a material other than plastic, such as, for example, glass, or a different material capable of transmitting light and altering its path of travel.

Returning to FIGS. 2-5, substrate 22, single white LED device 24, and optical assembly 30 of lamp subassembly 20 are housed in a light blocking baffle 28. Light blocking baffle 28 is made of plastic, and is configured with a hole in its bottom surface, such that light exiting the bottom of inner lens 38 will exit light blocking baffle 28. Light blocking baffle 28 is also configured such that little, if any, light from single white LED device 24 or inner lens 38 will exit lamp subassembly 20 at any location other than the light emitting hole in the bottom of light blocking baffle 28.

As shown, inner lens 38 is configured to slide into light blocking baffle 28, and is retained in place by inner retaining members 46. Substrate 22, having single white LED device 24 mounted on its first surface, is then positioned above inner lens 38 in light blocking baffle 28, such that single white LED device 24 is adjacent to inner lens 38. Substrate 22 is positioned in light blocking baffle 28 by sliding mounting holes 48 over outer retaining members 44. Finally, bracket 40 is positioned adjacent to, and in contact with, substrate 22 and light blocking baffle 28 by sliding mounting holes 48 of bracket 40 over outer retaining members 44 until retaining clips on outer retaining members 44 lock into place. In this manner, inner lens 38, single white LED device 24, substrate 22, and bracket 40 are secured in their proper locations in light blocking baffle 28.

Optical assembly 30 also includes a refracting outer lens 36 positioned in a hole in the bottom of housing 14 below inner lens 38 and single white LED device 24. Light emanating from inner refracting lens 38 is further redirected with refracting outer lens 36. The light first interacts with optical surfaces 37 and 35. These optics additionally bend the light toward the required driver side and passenger side zones. These surfaces may be planar or curved to direct and shape the independent beams of light. The rays then interact with surface 39, which is the final surface to shape the overall pattern of the beams and to direct them towards the required driver side and passenger side zones. The surface finish on surface 39 could be highly polished, EDM finished, in-molded holographic diffuser, micro-optics, or macro-optics, depending on the desired beam shape and appearance. Refracting outer lens 36 is formed with a transparent plastic material, and configured to fit an aperture formed in the bottom of the housing 14. Refracting outer lens 36 is shown including snaps that catch an upper edge within the aperture of housing 14 for snapping refracting outer lens 36 into place. Refracting outer lens 36 is preferably formed of a thickness, such that it may be mounted slightly recessed or flush with the outer bottom surface of housing 14.

More specifically, and as best shown in FIG. 3A, refracting outer lens 36 includes optical surface 35, optical surface 37, and an outer lens portion 39. Optical surface 35 includes an optical deviator for altering the direction at which light in second light pool 52 is emitted from the bottom of refracting outer lens 36 slightly towards the rear of the vehicle, such that the light is projected onto at least a portion of the driver's lap, as well as a portion of any center console that may be present in the vehicle. Optical surface 37 also includes an optical deviator, which is configured to redirect the light in first light pool 50 from inner lens 38 slightly to the rear of the vehicle, such that the light is projected onto at least a portion of the lap of the front passenger, if present. The deviators are preferably formed as a plurality of facets in the inside surface of the lens, such that the outside surface of the lens may follow the contour of the mirror housing 14.

In an alternative embodiment, mirror housing 14 may be formed of either an opaque material, or maybe formed of partially transparent materials, such that refracting lens 36 may be integrally formed within housing 14. Similar transparent mirror housings are disclosed and commonly assigned U.S. Patent Application Publication No. 2002/0024713, the entire disclosure of which is incorporated herein by reference.

Housing 14, in which lamp subassembly 12 is housed, includes a front opening adapted to receive a rearward viewing device 16. Rearward viewing device 16 may be a conventional prismatic mirror element, or may be an electrochromic glare-reducing mirror element, such as an electrochromic or liquid crystal dimming mirror element well known in the art. It should be understood that although FIGS. 1-5 show conventional rearward viewing device 16, the rearward viewing device 16 is intended to represent any rearward viewing device known in the art without deviating from the scope of the present invention. For example, rearward viewing device 16 may be a display that displays an image received by a camera mounted to the vehicle. If an electrochromic glare-reducing mirror element is used as rearward viewing device 16, the following list of patents provides an exemplary teaching of electro-optic devices in general, and more specifically, electrochromic rearview mirrors and associated circuitry.

U.S. Pat. No. 4,902,108, entitled "SINGLE COMPARTMENT, SELF-ERASING SOLUTION-PHASE ELECTROCHROMIC DEVICES, SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 5, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTRO-OPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosures of each, including the references contained therein, are hereby incorporated herein in their entirety by reference.

As shown, housing 14 is made of plastic, and includes an opening in the bottom portion of the housing, such that a portion of the vehicle can be illuminated by lamp subassembly 20 through the opening in the housing. Housing 14 also includes housing ribs 42, which act to prevent light emanating from single white LED device 24 from leaving housing 14 or reaching other areas of housing 14. This can be especially important in rearview assemblies incorporating electrochromic mirrors and associated sensors. This is due to the fact that light from single white LED device 24 that reaches an electrochromic mirror sensor could cause the electrochromic mirror to enter an improper state. Housing ribs 42 and light blocking baffle 28 act to prevent light from single white LED device 24 from escaping mirror housing 14 and from reaching unintended areas within mirror housing 14.

Referring specifically to FIGS. 5 and 5A, the operation of lamp subassembly 20 of rearview assembly 10 will now be described. Single white LED device 24, which is mounted on substrate 22, receives power from the vehicle by means of an electrical connection (not shown) to single white LED device 24 on substrate 22. A switch (not shown) external to lamp subassembly 20 is switched on by a user, causing single white LED device 24 to emit light. Light rays from single white LED device 24 travel from single white LED device 24, and initially impact the upper surface of inner lens 38. Light rays that initially impact the upper surface of inner lens 38 at angles greater than a certain amount are bent such that they impact the TIR reflecting surfaces 345 and 347. Rays impacting the TIR reflecting surfaces 345 and 347 are reflected from surfaces 345 and 347 such that they travel in a downward direction toward the lower surfaces of inner lens 38. Light rays impacting the upper surface of inner lens 38 at angles less than a certain amount, are bent and formed into columns such that they travel in a downward direction toward the lower surfaces of inner lens 38. As can be seen in FIG. 5, light rays impacting the upper surface of inner lens 38 on the left-hand side of inner lens 38 are bent, such that they begin to form a group of light rays 52, traveling in a direction that is generally down and toward the lower surfaces of inner lens 38 and to the left of the center of inner lens 38. As can also be seen, light rays from single white LED device 24 entering the upper surface of inner lens 38 on the right-hand side of inner lens 38 are bent, such that they form a group of light rays 50, traveling in a generally downward direction toward the lower surfaces of inner lens 38 and toward the right-hand side of inner lens 38. As the first pool of light rays 52 leaves the lower surfaces of inner lens 38, they pass through an optical deviator formed in the lower surfaces of inner lens 38. The optical deviator causes the light rays in second light pool 52 to further bend, such that light rays of second light ray pool 52 travel even more to the left, providing even greater separation between the light rays of second light pool 52 and first light pool 50. As the light rays of first light pool 50 exit the bottom of inner lens 38, they travel through an optical deviating surface on the bottom of inner lens 38, such that the light rays of first light pool 50 are further directed to the right, providing even greater separation between the light rays of second light pool 52 and first light pool 50. The light rays of first light pool 50 and second light pool 52, which are now traveling in different directions, continue to separate from each other until they impact the upper surfaces of outer refracting lens 36. The upper surface of outer refracting lens 36 has two optical surfaces 35 and 37 that cause the light rays in first light pool 50 and second light pool 52 to again alter their direction, such that the first light pool 50 and second light pool 52 diverge from each other at an even greater rate, and such that first light pool 50 provides illumination to the passenger side of the vehicle, while second light pool 52 provides illumination to the driver side of the vehicle.

As can be seen in FIGS. 5 and 5A, by the time the light rays of first light pool 50 and second light pool 52 exit the bottom surface of refracting lens 36, they form two substantially separate light pools, providing light for two different areas of the vehicle. It should be appreciated that light rays emitted by single white LED device 24 that are not captured by inner lens 38 are essentially prevented from escaping rearview assembly 10, due to the presence of light blocking baffle 28 and housing ribs 42 in housing 14.

As can be seen in FIGS. 2-5, light blocking baffle 28, which contains single white LED device 24, is formed such that light emitted from single white LED device 24 is blocked from propagating to other areas of rearview assembly 10. It should also be appreciated that any light that might happen to escape from light blocking baffle 28 should be blocked from leaving rearview assembly 10 by housing ribs 42 formed in housing 14. In addition, as noted above, light blocking baffle 28 and housing ribs 42 act to prevent light from reaching other areas of housing 14, preventing light from single white LED device 24 from interfering with other sensors that might be present in housing 14. The overall effect of lamp subassembly 20, as described above, is to provide two essentially separate light pools, referred to as first light pool 50 and second light pool 52.

FIGS. 7 and 7A provide a general schematic illustration of first light pool 50 and second light pool 52 relative to rearview assembly 10, as they would be projected onto a plane parallel to the ground at a distance of 45.7 centimeters below rearview assembly 10. The illuminance of first light pool 50 and second light pool 52 can be described by referring to the central points of each of the light pools, and concentric circles of light extending from the central points of each of the light pools.

First light pool 50 has a central point 80 located approximately 32 centimeters from a reference point 90 located directly below a center point 92 of rearview assembly 10 in the above-referenced plane. The distance between center point 92 of rearview assembly 10 and central point 80 is approximately 56 centimeters. The illuminance provided by first light pool 50 is greatest at the central point 80, and gradually decreases as the distance from the central point 80 increases. As shown, the illuminance at central point 80 is greater than or equal to 30 lux. Concentric ring 82 is a ring approximately 7.5 centimeters from central point 80, and centered on central point 80. The illuminance in first light pool 50 within concentric ring 82 is on average greater than or equal to 25 lux. Concentric ring 84 is a ring approximately 7.5 centimeters outside concentric ring 82, and is centered on concentric ring 82. The illuminance provided by first light pool 50 within concentric ring 84 is on average greater than or equal to 15 lux. Concentric ring 86 is a ring approximately 10 centimeters outside concentric ring 84, and is centered on concentric ring 84. The illuminance provided by first light pool 50 at concentric ring 86 is on average less than or equal to 15 lux.

Referring to second light pool 52, second light pool 52 has a central point 70 located approximately 32 centimeters from reference point 90. The distance between center point 92 of rearview assembly 10 and central point 70 is approximately 56 centimeters. The illuminance provided by second light pool 52 is greatest at the central point 70, and gradually decreases as the distance from the central point 70 increases. As shown, the illuminance at central point 70 is greater than or equal to 30 lux. Concentric ring 72 is a ring approximately 7.5 centimeters from central point 70 centered on central point 70. The illuminance provided by second light pool 52 within concentric ring 72 is on average greater than or equal to 25 lux. Concentric ring 74 is a concentric ring formed approximately 7.5 centimeters outside concentric ring 72, and centered on concentric ring 72. The illuminance provided by second light pool 52 within concentric ring 74 is on average greater than or equal to 15 lux. Concentric ring 76 is a concentric ring formed approximately 10 centimeters outside concentric ring 74, and centered on concentric ring 74. The illuminance provided by second light pool 52 at concentric ring 76 is on average less than or equal to 15 lux. First light pool 50 and second light pool 52 are substantially separate pools of light with an illuminance outside concentric ring 76 and concentric ring 86 of less than approximately 25 percent of the peak illuminance provided within concentric rings 76 and 86. In other words, there is an area separating first light pool 50 and second light pool 52 for which the illuminance provided by first light pool 50 and second light pool 52 is less than approximately 25 percent of the peak illuminance provided within concentric rings 76 and 86.

As described above, the invention provides for two substantially separate pools of light provided in a vehicle created by a single white LED device 24 by means of an optical assembly 30. By providing for two separate light pools using one single white LED device 24, the invention provides for lower cost, fewer components, lower heat dissipation, and higher reliability than typical multi-bulb incandescent vehicle optical assemblies.

FIG. 6 generally illustrates a lamp subassembly 20, according to an alternate embodiment of the present invention. This alternate embodiment is essentially the same as the first embodiment described above, with the exception that substrate 22 has a dielectric coating placed on the surface of substrate 22 that is in contact with bracket 40. In addition, bracket 40 of this embodiment is made from material suitable for serving as a heat sink, such as, for example, aluminum, copper, magnesium, or thermally conductive polymers. The dielectric coating deposited on the surface of substrate 22 acts to electrically insulate components and structures on the surface of substrate 22 from bracket 40, while still allowing thermal energy to be conducted from substrate 22 into bracket 40. By allowing thermal energy from substrate 22 to be conducted into bracket 40, bracket 40 can serve as a heat sink to remove excess thermal energy away from substrate 22, and the components mounted to substrate 22, including single white LED device 24. Preferably, bracket 40 is a metallic bracket. In an alternative embodiment, bracket 40 is treated with a surface emissivity enhancement, i.e., black-anodized, black-oxidized, black-sulphamate, black e-coated, etc., to assist in the removal of heat from substrate 22.

Figure 8:
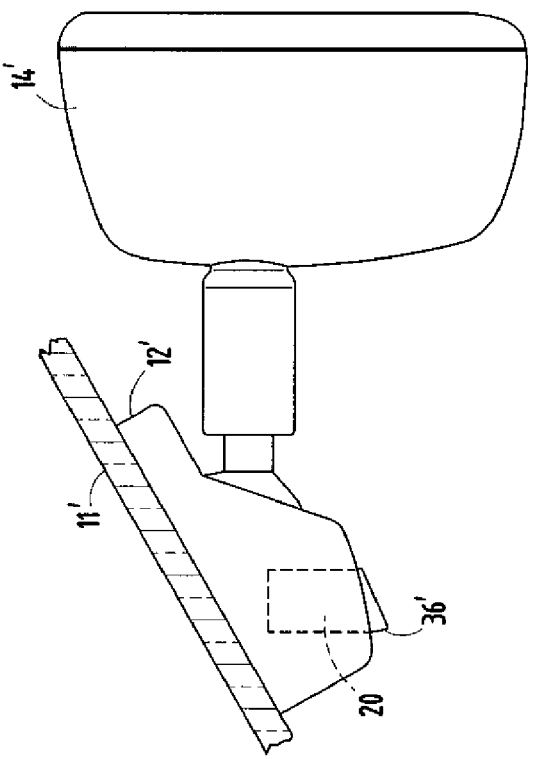
FIG. 8 is a side view of a rearview assembly for a vehicle, according to a third embodiment of the present invention.

FIG. 8 generally illustrates a rearview assembly 10', according to a second embodiment of the present invention. As shown, rearview assembly 10' includes a housing 14' supported on a mounting structure 12'. Mounting structure 12' secures housing 14' to a vehicle windshield 11'. As shown, housing 14' is configured such that it can contain vehicle electronic devices. In this embodiment, a lamp subassembly 20 is incorporated into mounting structure 12', rather than being incorporated into housing 14' as shown in the previous embodiment. Lamp subassembly 20 is essentially the same as the lamp subassembly 20 described in the previous embodiments, with the exception that various components of lamp subassembly 20 may be sized differently to allow lamp subassembly 20 to be incorporated into mounting structure 12'. It should be appreciated that the essential functionality of lamp subassembly 20, i.e., the ability to provide two substantially separate pools of light from one single light LED device using a reflector and/or refracting lenses, as described above, can be maintained, in spite of dimensional changes to various elements of lamp subassembly 20 and elements used to secure lamp subassembly 20 to mounting structure 12'. For example, the dimensions of substrate 22 (not shown), inner lens 38 (not shown), light blocking baffle 28 (not shown), single white LED device 24 (not shown), and outer refracting lens 36' can be altered while maintaining the desired functionality.

Although FIG. 8 shows refracting lens 36' extending below the lower surface of mounting structure 12', it should be appreciated that refracting lens 36' can be configured such that the lower surface of refracting lens 36' is mounted to be slightly recessed or flush with the outer bottom surface of mounting structure 12'. By incorporating lamp subassembly 20 into mounting structure 12', rather than in housing 14', the light pools provided by lamp subassembly 20' can be provided in a fixed position, so as not to be effected by the adjustment of housing 14'. Additionally, by providing the lamp subassembly 20 in mounting structure 12', the rearview assembly 10' may be used in markets for either left- or right-hand drive vehicles without requiring any modification to the rearview assembly 10'. It should be appreciated that mounting structure 12' could be constructed of a material that is transparent to light emitted from single white LED device 24 (not shown), such that refracting lens 36' can be formed as a part of mounting structure 12'.

While the lamp subassemblies 20 are generally described above functioning as map lamps provided on or in a rearview assembly 10, it will be appreciated by those skilled in the art that lamp subassembly 20, or certain aspects of lamp subassembly 20, may be utilized in other applications in a vehicle or elsewhere. For example, lamp subassembly 20 could be used in an overhead console, windshield console, a sun visor, in a headliner, in door panels, or other areas of a vehicle. Other potential applications include dome lights, vanity mirror lights, headlamps, as well as engine and trunk compartment lights. Slight modifications to lamp subassembly 20 for use in these and other applications will be clear to those skilled in the art.

In addition to vehicular embodiments, the present invention may be used in non-vehicular embodiments that can benefit from high-efficiency, high-reliability, long-life, low-voltage, compact, and white light illumination from a single light emitting device, without diverting from the present teachings. Such applications include handheld portable flashlights, head or helmet mounted lamps for mining or mountaineering, automatically activated emergency lighting or backup lighting in commercial buildings, and other possible applications. Minor modifications to the components of lamp subassembly 20 will be clear to those skilled in the art, and it should be understood that these vehicular and non-vehicular uses of lamp subassembly 20 fall within the scope of the present invention. It should also be appreciated that vehicular uses of lamp subassembly 20 include automobiles, boats, airplanes, ships, busses, and other vehicles.

Figure 9:
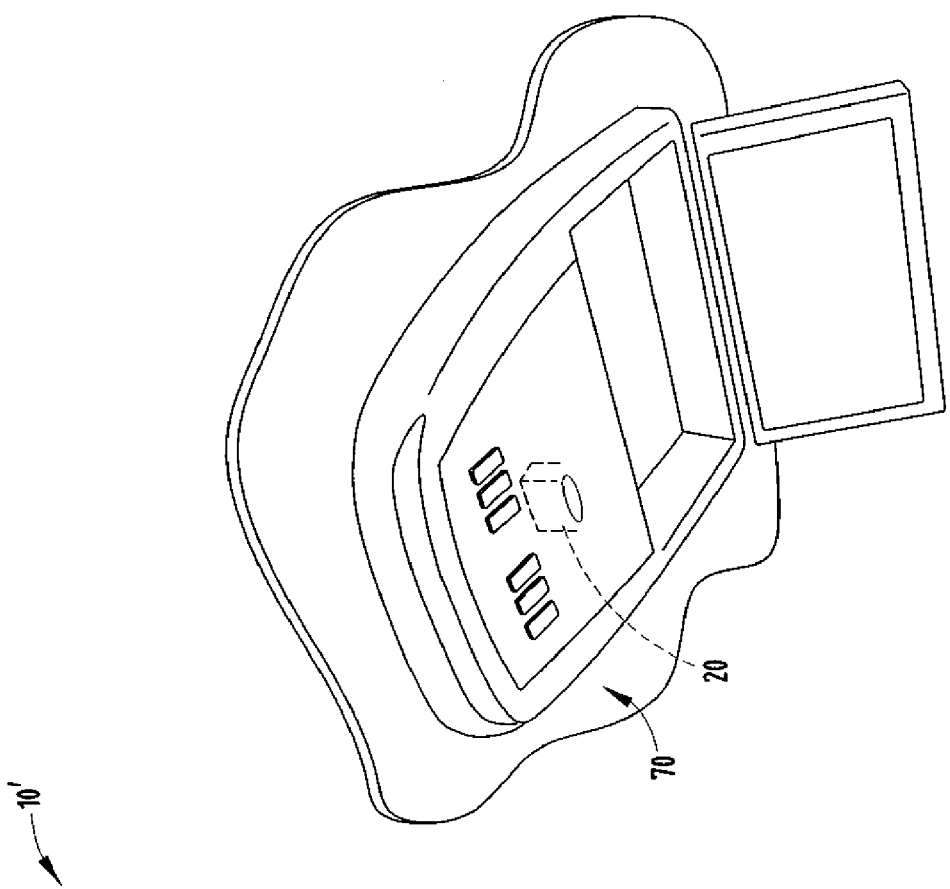
FIG. 9 is an orthographic view of a vehicle optical accessory according to a fourth embodiment of the present invention.

FIG. 9 generally illustrates a lamp subassembly 20, according to a third embodiment of the present invention. In this embodiment, lamp subassembly 20 is shown housed in a vehicle overhead console 70. As shown, lamp subassembly 20 is essentially the same as generally illustrated in FIGS. 2-5, according to the first embodiment. Lamp subassembly 20 is configured to provide two substantially separate pools of light to vehicle locations on either side of overhead console 70. It should be appreciated, as noted above, that the geometries of various components of lamp subassembly 20, and structures used to mount lamp subassembly 20 to the vehicle, can be altered, such that lamp subassembly 20 can fit into overhead console 70 without altering the desired functionality of lamp subassembly 20. In other words, changes to the dimensions of substrate 22, single white LED device 24, light blocking baffle 28, and lenses 36 and 38 can be made while the retaining the ability of lamp subassembly 20 provide two substantially separate pools of light from one single white LED device 24.

It should be appreciated that although the above-described embodiments call for a single white LED device 24 that is switched to either an on or off position by an external switch, single white LED device 24 could be electrically coupled to additional circuitry on substrate 22 that is configured to vary the intensity of the light provided by single white LED device 24, rather than simply turning single white LED device 24 on or off. The ability to alter the intensity of light provided by single white LED device 24 may be provided by utilizing a pulse width modulated signal sent from a microcontroller, or other logic circuitry, provided on substrate 22. A microcontroller may be programmed to operate and control the relative intensity of single white LED device 24 in response to activation of manual switches on rearview assembly 10, or elsewhere in the vehicle, or upon command from another electronic module in the vehicle, via either discrete wiring, a vehicle bus, or a wireless link.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims, as interpreted according to the principles of patent law, including the doctrine of equivalents.

What is claimed is:

1. A rearview assembly for a vehicle comprising:
a mounting structure adapted to be mounted to a vehicle;
a housing coupled to said mounting structure;
rearward viewing device coupled to said housing for providing a rearward view to a vehicle occupant; and
a lamp subassembly coupled to said housing, said lamp subassembly comprising:
a substrate having a first surface;
a single white LED device mounted on the first surface of said substrate; and
an optical assembly adjacent to said single white LED device, said optical assembly comprising secondary optics, wherein said optical assembly receives light emanating from said single white LED device and optically alters the received light in said secondary optics to provide two substantially separate pools of light external to said optical assembly.

2. The rearview assembly of claim 1, wherein said secondary optics comprise an inner refracting optical surface configured to refract light from said single white LED device, a refracting riser wall surface configured to refract light emanating from said single white LED device toward a reflective surface, and a reflective surface, wherein light from said single white LED device is at least one of refracted by said inner refracting optical surface, and refracted by said refracting riser wall surface and reflected by said reflecting surface to provide the two substantially separate pools of light.

3. The rearview assembly of claim 2, wherein said inner refracting optical surface, refracting riser wall surface and reflective surface are formed as one unitary structure.

4. The rearview assembly of claim 2, wherein no surface of said secondary optics is part of an exposed surface of said housing.

5. The rearview assembly of claim 2, wherein at least one surface of said secondary optics is part of an exposed surface of said housing.

6. The rearview assembly of claim 2, wherein said secondary optics further comprise an outer refracting lens.

7. The rearview assembly of claim 6, wherein said inner refracting optical surface, refracting riser wall surface, and reflective surface are not part of an exposed surface of said housing, and wherein said outer refracting lens is an outer refracting lens that is part of an exposed surface of said housing.

8. The rearview assembly of claim 1, wherein said substrate further comprises electronic circuitry in addition to circuitry associated with said optical assembly.

9. The rearview assembly of claim 5, wherein said substrate further comprises electronic circuitry in addition to circuitry associated with said optical assembly.

10. The rearview assembly of claim 1, further comprising a light blocking baffle located in said housing and at least partially enclosing said optical assembly and said single white LED device, wherein said light blocking baffle is configured to substantially prevent light emanating from said single white LED device from exiting said optical assembly through areas other than said secondary optics.

11. The rearview assembly of claim 7, further comprising a light blocking baffle located in said housing and at least partially enclosing said optical assembly and said single white LED device, wherein said light blocking baffle is configured to substantially prevent light emanating from said single white LED device from exiting said optical assembly through areas other than said outer refracting lens.

12. The rearview assembly of claim 11, further comprising at least one copper plated area on at least one side of said substrate, wherein said at least one copper plated area is configured to remove thermal energy from at least one of said single white LED device and said substrate.

13. The rearview assembly of claim 11, further comprising a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

14. The rearview assembly of claim 1, wherein said housing comprises ribs at least partially enclosing said optical assembly and said single white LED device, wherein said ribs are configured to substantially prevent light emanating from said single white LED device from exiting said optical assembly through areas other than said secondary optics.

15. The rearview assembly of claim 5, wherein said housing comprises ribs at least partially enclosing said optical assembly and said single white LED device, wherein said ribs are configured to substantially prevent light emanating from said single white LED device from exiting said optical assembly through areas other than said outer refracting lens.

16. The rearview assembly of claim 14, further a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

17. The rearview assembly of claim 15, further comprising a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

18. The rearview assembly of claim 1, wherein said substrate is a printed circuit board (PCB), comprising at least one of aluminum, a thermally conductive polymer, an epoxy material reinforced with woven fiberglass, and a composite material comprising woven glass fabric, paper and epoxy.

19. The rearview assembly of claim 18, wherein said PCB comprises aluminum, and wherein said PCB acts as a heat sink to remove thermal energy from said single white LED device and the vicinity of said single white LED device.

20. The rearview assembly of claim 18, wherein said PCB comprises a thermally conductive polymer, and wherein said PCB acts as a heat sink to remove thermal energy from said single white LED device and the vicinity of said single white LED device.

21. The rearview assembly of claim 1, wherein at least one of said two substantially separate pools of light provides a peak illuminance value at some predetermined distance from said optical assembly of at least 30 lux.

22. The rearview assembly of claim 1, wherein each of said two substantially separate pools of light provides a peak illuminance value at some predetermined distance from said optical assembly of at least 30 lux.

23. The rearview assembly of claim 21, wherein the predetermined distance is approximately 45.7 centimeters below the bottom of said optical assembly.

24. The rearview assembly of claim 22, wherein the predetermined distance is approximately 45.7 centimeters below the bottom of said optical assembly.

25. The rearview assembly of claim 2, wherein said reflective surface is a total internal reflection (TIR) surface.

26. The rearview assembly of claim 1, wherein the two substantially separate pools of light are separated by an area in which the illuminance provided by the pools of light in a plane parallel to the ground and located at a predetermined distance below the rearview assembly is less than approximately 25% of the peak illuminance provided by the pools of light in the plane.

27. The rearview assembly of claim 26, wherein the predetermined distance is 45.7 centimeters.

28. A rearview assembly for a vehicle comprising:
a mounting structure adapted to be mounted to a vehicle;
a housing coupled to said mounting structure;
rearward viewing device coupled to said housing for providing a rearward view to a vehicle occupant; and
a lamp subassembly coupled to said mounting structure, said lamp subassembly comprising:
a substrate having a first surface;
a single white LED device mounted on the first surface of said substrate; and
an optical assembly adjacent to said single white LED device, said optical assembly comprising secondary optics, wherein said optical assembly receives light emanating from said single white LED device and optically alters the received light in said secondary optics to provide two substantially separate pools of light external to said optical assembly.

29. The rearview assembly of claim 28, wherein said secondary optics comprise an inner reflecting optical surface configured to refract light from said single white LED device, a refracting riser wall surface configured to refract light emanating from said single white LED device toward a reflective surface, and a reflective surface, wherein light from said single white LED device is at least one of refracted by said inner refracting optical surface, and refracted by said refracting riser wall surface and reflected by said reflecting surface to provide the two substantially separate pools of light.

30. The rearview assembly of claim 29, wherein said inner refracting optical surface, refracting riser wall surface, and reflective surface are one unitary structure.

31. The rearview assembly of claim 29, wherein said secondary optics further comprise an outer refracting lens.

32. The rearview assembly of claim 31, wherein said inner refracting optical surface, refracting riser wall surface, and reflective surface are not part of an exposed surface of said mounting structure, and wherein said outer refracting lens is an outer refracting lens that is part of an exposed surface of said mounting structure.

33. The rearview assembly of claim 28, wherein said substrate further comprises electronic circuitry in addition to circuitry associated with said optical assembly.

34. The rearview assembly of claim 28, further comprising a light blocking baffle located in said mounting structure and at least partially enclosing said optical assembly and said single white LED device, wherein said light blocking baffle is configured to substantially prevent light emanating from said single white LED device from exiting saki optical assembly through areas other than said secondary optics.

35. The rearview assembly of claim 32, further comprising a light blocking baffle located in said mounting structure and at least partially enclosing said optical assembly and said single white LED device, wherein said light blocking baffle is configured to substantially prevent light emanating from said single white LED device from exiting said optical assembly through areas other than said outer refracting lens.

36. The rearview assembly of claim 35, further comprising at least one copper plated area on at least one side of said substrate, wherein said at least one copper plated area is configured to remove thermal energy from at least one of said single white LED device and said substrate.

37. The rearview assembly of claim 28, wherein said mounting structure comprises ribs at least partially enclosing said optical assembly and said single white LED device, wherein said ribs are configured to substantially prevent light emanating from said single white LED device from exiting said optical assembly through areas other than said secondary optics.

38. The rearview assembly of claim 28, wherein said substrate is a printed circuit board (PCB), comprising at least one of aluminum, a thermally conductive polymer, an epoxy material reinforced with woven fiberglass, and a composite material comprising woven glass fabric, paper and epoxy.

39. The rearview assembly of claim 38, wherein said PCB comprises aluminum, and wherein said PCB acts as a heat sink to remove thermal energy from said single white LED device and the vicinity of said single white LED device.

40. The rearview assembly of claim 38, wherein said PCB comprises a thermally conductive polymer, and wherein said PCB acts as a heat sink to remove thermal energy from said single white LED device and the vicinity of said single white LED device.

41. The rearview assembly of claim 28, wherein at least one of said two substantially separate pools of light provides a peak illuminance at some predetermined distance from said optical assembly of at least 30 lux.

42. The rearview assembly of claim 41, wherein the predetermined distance is approximately 45.7 centimeters below the bottom of said optical assembly.

43. The rearview assembly of claim 28, wherein the two substantially separate pools of light are separated by an area in which the illuminance provided by the pools of light in a plane parallel to the ground and located at a predetermined distance below the rearview assembly is less than approximately 25% of the peak illuminance provided by the pools of light in the plane.

44. A vehicle optical accessory comprising:
a housing adapted to be mounted to a vehicle;
a substrate located in said housing and having a first surface;
a single white LED device mounted on the first surface of said substrate; and
an optical assembly at least partially disposed in said housing and adjacent to said single white LED device, said optical assembly comprising secondary optics, wherein said optical assembly receives light emanating from said single white LED device and optically alters the received light in said secondary optics to provide two substantially separate pools of light external to said optical assembly.

45. The vehicle optical accessory of claim 44, wherein said secondary optics comprise an inner refracting optical surface configured to refract light from said single white LED device, a refracting riser wall surface configured to refract light emanating from said single white LED device toward a reflective surface, and a reflective surface,, wherein light from said single white LED device is at least one of refracted by said inner refracting optical surface, and refracted by said refracting riser wall surface and reflected by said reflecting surface to provide the two substantially separate pools of light.

46. The vehicle optical accessory of claim 45, wherein said inner refracting optical surface, refracting riser wall surface, and reflective surface are formed as one unitary structure.

47. The vehicle optical accessory of claim 45, wherein no surface of said secondary optics is part of an exposed surface of said housing.

48. The vehicle optical accessory of claim 45, wherein at least one surface of said secondary optics is part of an exposed surface of said housing.

49. The vehicle optical accessory of claim 45, wherein said secondary optics further comprise an outer refracting lens.

50. The vehicle optical accessory of claim 49, wherein said inner refracting optical surface, refracting riser wall surface, and reflective surface are not part of an exposed surface of said housing, and wherein said outer refracting lens is an outer refracting lens that is part of an exposed surface of said housing.

51. The vehicle optical accessory of claim 44, wherein said substrate further comprises electronic circuitry in addition to circuitry associated with said optical assembly.

52. The vehicle optical accessory of claim 48, wherein said substrate further comprises electronic circuitry in addition to circuitry associated with said optical assembly.

53. The vehicle optical accessory of claim 44, further comprising a light blocking baffle located in said housing and at least partially enclosing said optical assembly and said single white LED device, wherein said light blocking baffle is configured to substantially prevent light emanating from said single white LED device from exiting said optical assembly through areas other than said secondary optics.

54. The vehicle optical accessory of claim 50, further comprising a light blocking baffle located in said housing and at least partially enclosing said optical assembly and said single white LED device, wherein said light blocking baffle is configured to substantially prevent light emanating from said single white LED device from exiting said optical assembly through areas other than said outer refracting lens.

55. The vehicle optical accessory of claim 54, further comprising at least one copper plated area on at least one side of said substrate, wherein said at least one copper plated area is configured to remove thermal energy from at least one of said single white LED device and said substrate.

56. The vehicle optical accessory of claim 54, further comprising a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

57. The vehicle optical accessory of claim 44, wherein said housing comprises ribs at least partially enclosing said optical assembly and said single white LED device, wherein said ribs are configured to substantially prevent light emanating from said single white LED device from exiting said optical assembly through areas other than said secondary optics.

58. The vehicle optical accessory of claim 48, wherein said housing comprises ribs at least partially enclosing said optical assembly and said single white LED device, wherein said ribs are configured to substantially prevent light emanating from said single white LED device from exiting said optical assembly through areas other than said outer refracting lens.

59. The vehicle optical accessory of claim 57, further a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

60. The vehicle optical accessory of claim 48, further comprising a thermally conductive structure coupled to said substrate, wherein said substrate is coated with a dielectric material on a surface opposite the first surface that is in contact with said thermally conductive structure, and wherein said thermally conductive structure acts to remove thermal energy from at least one of said single white LED device and said substrate.

61. The vehicle optical accessory of claim 44, wherein said substrate is a printed circuit board (PCB), comprising at least one of aluminum, a thermally conductive polymer, an epoxy material reinforced with woven fiberglass, and a composite material comprising woven glass fabric, paper and epoxy.

62. The vehicle optical accessory of claim 61, wherein said PCB comprises aluminum, and wherein said PCB acts as a heat sink to remove thermal energy from said single white LED device and the vicinity of said single white LED device.

63. The vehicle optical accessory of claim 61, wherein said PCB comprises a thermally conductive polymer, and wherein said PCB acts as a heat sink to remove thermal energy from said single white LED device and the vicinity of said single white LED device.

64. The vehicle optical accessory of claim 44, wherein at least one of said two substantially separate pools of light provides a peak illuminance at some predetermined distance from said optical assembly of at least 30 lux.

65. The vehicle optical accessory of claim 44, wherein each of said two substantially separate pools of light provides a peak illuminance at some predetermined distance from said optical assembly of at least 30 lux.

66. The vehicle optical accessory of claim 64, wherein the predetermined distance is approximately 45.7 centimeters below the bottom of said optical assembly.

67. The vehicle optical accessory of claim 65, wherein the predetermined distance is approximately 45.7 centimeters below the bottom of said optical assembly.

68. The vehicle optical accessory of claim 45, wherein said reflective surface is a total internal reflection (TIR) surface.

69. The rearview assembly of claim 44, wherein the two substantially separate pools of light are separated by an area in which the illuminance provided by the pools of light in a plane parallel to the ground and located at a predetermined distance below the rearview assembly is less than approximately 25% of the peak illuminance provided by the pools of light in the plane.

70. The rearview assembly of claim 69, wherein the predetermined distance is 45.7 centimeters.

71. The vehicle optical accessory of claim 44, wherein at least one of said housing, said substrate, said single white LED device and said optical assembly is located in an overhead structure of a vehicle.

72. The vehicle optical accessory of claim 71, wherein said overhead structure is an overhead console.

73. The vehicle optical accessory of claim 44, wherein the vehicle optical accessory is configured to function as a map-light.

74. The rearview assembly of claim 43, wherein the predetermined distance is 45.7 centimeters.

* * * * *